(12) United States Patent
Mai et al.

(10) Patent No.: US 10,003,234 B2
(45) Date of Patent: Jun. 19, 2018

(54) ELECTRICAL MACHINE COMPRISING A FASTENING FLANGE

(71) Applicant: Robert Bosch GmbH, Stuttgart (DE)

(72) Inventors: Stefan Mai, Karlsruhe (DE); Torsten Gmuend, Rastatt-Pliitersdorf (DE)

(73) Assignee: Robert Bosch GmbH, Stuttgart (GB)

( * ) Notice: Subject to any disclaimer, the term of this patent is extended or adjusted under 35 U.S.C. 154(b) by 122 days.

(21) Appl. No.: 14/944,809

(22) Filed: Nov. 18, 2015

(65) Prior Publication Data

US 2016/0146233 A1     May 26, 2016

(30) Foreign Application Priority Data

Nov. 21, 2014    (DE) .......................... 10 2014 223 804

(51) Int. Cl.
*H02K 5/15*     (2006.01)
*H02K 5/04*     (2006.01)
*H02K 5/00*     (2006.01)

(52) U.S. Cl.
CPC ............... *H02K 5/15* (2013.01); *H02K 5/00* (2013.01); *H02K 5/04* (2013.01); *Y10T 403/64* (2015.01); *Y10T 403/642* (2015.01)

(58) Field of Classification Search
CPC .. H02K 5/00; H02K 5/04; H02K 5/26; H02K 5/15; Y10T 403/64; Y10T 403/642; Y10T 403/648
See application file for complete search history.

(56) References Cited

U.S. PATENT DOCUMENTS

| 2,958,794 | A | * | 11/1960 | Mann | F16H 3/26 310/75 R |
| 3,313,968 | A | * | 4/1967 | Kaiser | H02K 5/15 310/401 |
| 4,071,788 | A | * | 1/1978 | Martin | H02K 1/148 310/216.098 |
| 4,186,319 | A | * | 1/1980 | Dochterman | H02K 5/15 220/327 |
| 4,355,253 | A | * | 10/1982 | Vollbrecht | H01R 39/40 310/239 |

(Continued)

FOREIGN PATENT DOCUMENTS

| DE | 102006038350 A1 * | 2/2008 | ............ F02N 15/00 |
| DE | 102008002288 A1 * | 12/2009 | ............ F02F 7/0068 |

(Continued)

*Primary Examiner* — Joshua J Michener
*Assistant Examiner* — Matthew J Gitlin
(74) *Attorney, Agent, or Firm* — Michael Best & Friedrich LLP

(57) ABSTRACT

An electrical machine (12) comprising a fastening flange (10), wherein the fastening flange (10) has a rim (46), so that the fastening flange (10) is arranged on a housing part (14) of the electrical machine (12) in such a way that the fastening flange (10) surrounds the housing part (14) at least in sections in the circumferential direction (16) of the housing part (14) at least by way of the rim (46), wherein the fastening flange (10) has at least one radially directed raised portion (18) which is integrally formed from the fastening flange (10) and bears against the housing part (14), wherein at least one recess (47) is formed within the rim (46), wherein the recess (47) influences the rigidity of the fastening flange (10).

25 Claims, 2 Drawing Sheets

(56) References Cited

U.S. PATENT DOCUMENTS

| | | | | |
|---|---|---|---|---|
| 4,631,433 | A * | 12/1986 | Stokes | H02K 5/08 310/43 |
| 5,767,596 | A * | 6/1998 | Stark | H02K 5/00 29/596 |
| 5,929,545 | A * | 7/1999 | Fargo | H02K 5/15 310/216.049 |
| 5,969,447 | A * | 10/1999 | Periyathamby | H02K 5/143 310/51 |
| 6,188,156 | B1 * | 2/2001 | Maldeney | H02K 5/15 29/596 |
| 6,713,916 | B1 * | 3/2004 | Williams | H02K 5/00 310/58 |
| 6,809,445 | B2 * | 10/2004 | Reddy | H02K 5/225 310/71 |
| 6,849,974 | B2 * | 2/2005 | Howe | H02K 5/08 29/596 |
| 7,408,282 | B2 * | 8/2008 | Stewart | H02K 1/146 310/216.132 |
| 7,839,038 | B2 * | 11/2010 | Simofi-Ilyes | H02K 5/06 310/402 |
| 8,502,436 | B2 * | 8/2013 | Wilson, Jr. | H02K 5/06 310/401 |
| 9,347,509 | B2 * | 5/2016 | Oppenheimer | F16F 15/04 |
| 2005/0161577 | A1 * | 7/2005 | French | H02K 5/00 248/672 |
| 2007/0024135 | A1 * | 2/2007 | Simofi-Ilyes | H02K 5/06 310/89 |
| 2015/0249376 | A1 * | 9/2015 | Hiwaki | H02K 5/04 310/43 |
| 2016/0072344 | A1 * | 3/2016 | Durantay | H02K 5/12 310/45 |
| 2016/0294247 | A1 * | 10/2016 | Bauer | H02K 5/04 |
| 2016/0294249 | A1 * | 10/2016 | Keller | H02K 5/00 |

FOREIGN PATENT DOCUMENTS

| | | | |
|---|---|---|---|
| DE | 102013222402 | 5/2015 | |
| JP | 56074055 A * | 6/1981 | H02K 5/15 |

* cited by examiner

ELECTRICAL MACHINE COMPRISING A FASTENING FLANGE

BACKGROUND OF THE INVENTION

The invention proceeds from an electrical machine comprising a fastening flange. The fastening flange serves to fasten the electrical machine to an object. The object can be a body of a motor vehicle, or a device which is to be adjusted by the electrical machine. Electrical machines comprising a fastening flange are known, as shown in DE 10 2013 224 02. In this electrical machine, the fastening flange bears against a housing part of the electrical machine by way of a raised portion. Projections are fitted to the fastening flange in the region of the raised portions, wherein the projections extend radially starting from the fastening flange. In this case, the projections are arranged on a rim which runs around the electrical machine in a closed manner and is part of the fastening flange. In this case, the rim extends radially outward starting from the fastening flange. Forming of the raised portions, which are integrally formed from the fastening flange, causes deformation of the rim and, as a result, incorrect positioning of the projections.

SUMMARY OF THE INVENTION

The apparatus according to the invention has the advantage over the prior art that the integral raised portions do not cause any deformation or incorrect positioning of the projections since recesses are arranged in the rim, so that the rigidity of the fastening flange or of the rim in the region of the projection is reduced. On account of the reduced rigidity, the fastening flange or the rim is therefore no longer warped during forming of the raised portion, as a result of which incorrect positioning of the projection is avoided. The rim preferably borders the electrical machine in a circular manner. The recesses can have different shapes. For example, the recesses can be round holes or elongate holes which are elongated in the circumferential direction. Furthermore, the elongate holes can extend in the circumferential direction and run around the electrical machine in the rim. The elongate holes can also run in a spiral manner in the rim, so that the start and end of an elongate hole are not arranged on the same radial circumference.

The recess is advantageously at a distance from a radially outer edge of the rim, so that the recess is fully enclosed by the rim. In this case, the rim extends transversely to the axial direction of the electrical machine, so that the radially outer edge of the rim borders the rim and is averted from the electrical machine. The axial direction of the electrical machine is perpendicular to the rotation direction of the electrical machine. The recesses which are arranged in the rim, and are therefore surrounded by the rim, create a sheet-metal strip between the outer edge and the recess. In addition, a residual rim is created between the recess and the region of the fastening flange starting from which the rim extends. The residual rim is part of the rim and borders the electrical machine in a preferably closed manner. The residual rim is situated radially further inward in relation to the sheet-metal strip. The recesses are arranged between the sheet-metal strip and the residual rim. The sheet-metal strip extends along the circumferential direction of the fastening flange. In this case, the sheet-metal strip runs around the housing part. A fastening flange having a recess of this kind has the advantage that the rigidity of the fastening flange can be regulated by the width of the sheet-metal strip in the radial direction. If a sheet-metal strip which has a width of 50% of the total width of the rim with respect to the radial direction is realized, the rigidity is increased in comparison to a sheet-metal strip which has a width of only 40%, 30%, 20%, 10% or 5% of the total width of the rim, wherein it is also possible to select values for the width of the sheet-metal strip which lie between said values. The width of the sheet-metal strip is selected depending on the rigidity requirements made of the fastening flange. It is possible to configure the width of the sheet-metal strip by varying the radial extent of the recess or by virtue of the position of the recess. It is therefore feasible for the recess to take up, for example, 50% of the total width of the rim in the radial direction, but to be seated radially centrally in the rim. Therefore, the width of the sheet-metal strip is 25% of the total width. It is also feasible for the recess to be arranged further radially in the direction of the outer edge by a radial, incremental length extent, so that the sheet-metal strip therefore becomes narrower, without the recess having relatively large dimensions. However, the residual rim is therefore wider. In this way, it is possible to adjust the rigidity of the fastening flange precisely to the mechanical requirements during the manufacturing process for said fastening flange by virtue of the width of the residual rim and/or of the recess and/or of the sheet-metal strip.

In one development of the present invention, the recess is arranged in the rim next to a projection with respect to the circumferential direction, so that the recess is not arranged between the projection and the residual rim. This has the advantage that the rigidity of the fastening flange is not excessively weakened in comparison to an embodiment in which the recess is arranged between a projection and a residual rim with respect to the circumferential direction. In this case, it is also feasible for the recess to be arranged partially between the projection and the residual rim, so that a section of the recess which extends in the circumferential direction is not arranged between the projection and the residual rim.

An embodiment in which a plurality of projections are arranged on the fastening flange is feasible. In this case, the number of projections is preferably three. At least one recess is advantageously arranged between two projections. These recesses are arranged next to one another—in the circumferential direction in particular—and do not overlap. This has the advantage that the fastening flange can be matched to the requirements for rigidity. If the rim and the projection are in two different planes, it is possible to configure the fastening flange to meet the customer requirements, so that the fastening flange can be used, for example, in a large number of types of vehicle. In this case, the plane of the rim can be parallel to the plane of the projection. It is also feasible for the plane of the rim to be tilted in relation to the plane of a projection. The planes can be arranged in relation to one another by angling the projection. In this case, the projection has a distal end which is directed away from the rim, and is situated entirely in a first plane. Downstream of a first bend, which is generated by the angling process, the projection runs in a second plane which is arranged between the distal end and the rim. It is also possible to arrange a second bend radially further inward downstream of the first bend and downstream of the second plane. In this case, the second bend can be arranged in the rim, so that the sheet-metal strip and the residual rim are arranged in two different planes. In this case, the residual rim is in particular parallel to the first plane of the distal end. The second bend preferably runs around the fastening flange, but the second bend can be interrupted by the recesses. In this case, the second bend can be situated centrally in the rim with respect to the radial direction.

Expediently, the projections preferably have receptacles for connecting elements at their distal ends. These connecting elements can be screws, rivets, pins and/or clips. A projection of this kind advantageously allows the fastening flange to be fastened to an adjusting apparatus and to a transmission actuator or to a body of a motor vehicle.

A plurality of recesses are advantageously formed in the rim. The recesses are arranged next to one another in the circumferential direction. It is also feasible for the recesses to have a radial offset. In this case, two recesses which are immediately adjacent to one another are separated from one another by a radially extending sheet-metal web. In this case, the sheet-metal web extends from the sheet-metal strip as far as the opposite residual rim in a radial manner. This has the advantage that the rigidity of the rim and therefore of the entire fastening flange can be set in an optimum manner by the sheet-metal web. In this case, the rigidity increases as the sheet-metal web widens.

In an advantageous development, the fastening flange has a circular collar which extends axially along the housing at least in sections and has at least one raised portion. The collar is arranged at that end of the residual rim which is directed radially inward and which faces the electrical machine. The annular collar borders the housing part in the circumferential direction such that it is closed or in sections, wherein the collar extends axially along the housing in the form of a sleeve. The collar allows exact alignment of the fastening flange on the housing part. The raised portion, which is formed from the collar, ensures the advantageous formation of a gap between the collar and the housing part, wherein the gap extends in the circumferential direction and/or in the axial direction. The gap ensures a high-quality weld seam. The raised portions in the collar are preferably arranged downstream of the projections with respect to the circumferential direction, so that the recesses are preferably arranged between the two raised portions.

The fastening flange is expediently produced from a cold-formed sheet-metal part which, in particular for the most part, is produced by means of a deep-drawing process and/or a cutting process. In this case, the raised portion is formed from the collar, so that the raised portion is integrally formed with the fastening flange. This advantageous embodiment of the fastening flange as a bent and stamped part produced by a cold-forming process allows reliable and cost-effective series production.

The fastening flange has an advantageous coating which protects against corrosion. The coating is provided, for example, with proportions of tin, zinc, nickel, chromium and/or copper. The coating can be applied to the fastening flange in a simple manner by a galvanic process.

BRIEF DESCRIPTION OF THE DRAWINGS

Embodiments of the invention are illustrated in the drawings and explained in greater detail in the following description. In the drawings.

DETAILED DESCRIPTION

Figure 1:
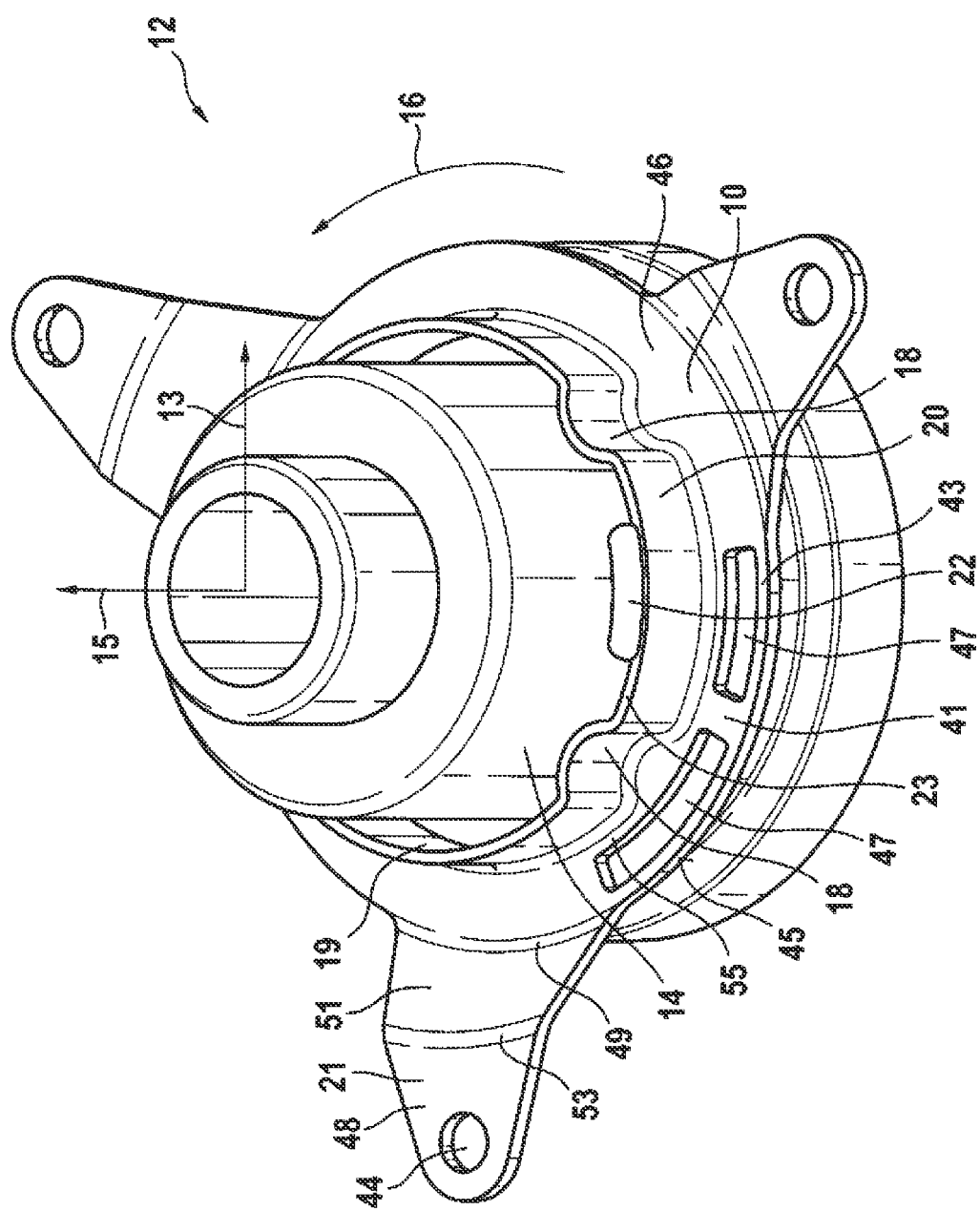
FIG. 1 shows an electrical machine comprising a fastening flange according to the invention.

FIG. 1 shows an electrical machine 12 comprising a fastening flange 10. The fastening flange 10 is arranged on a cylindrical housing part 14 of the electrical machine 12. It is also feasible for the housing part 14 to be provided with a shape other than the cylindrical shape. Therefore, the housing part 14 could have, for example, square, box-like or polygonal shapes which meet the requirements of an apparatus to which the electrical machine 12 is connected. The housing part 14, which is shown in FIG. 1, is a pole housing of an electrical machine 12. The permanent magnets or a stator with electromagnetic coils are/is arranged in the pole housing. The fastening flange 10 has a collar 20 with raised portions 18. The collar 20 runs around the housing part 14 in a closed manner. In this case, the collar 20 extends parallel along the housing part 14 in the axial direction 15. The raised portions 18 bear against the housing part 14. In this case, the raised portions 18 are integrally formed from the collar 20 in a radially inward manner. The raised portions 18 have a radius. Therefore, the raised portions 18 are curved in the radial direction 13, and the curvature of said raised portions bears against the housing part 14. Two raised portions 18 can be seen in FIG. 1. However, it is also possible to arrange more than two raised portions 18 in the collar 20. Since the raised portions 18 make contact with the housing part 14, the collar 20 is at a distance from the housing part 14, so that a gap 19 is formed. The gap 19 extends both in the circumferential direction 16 and also in the axial direction 15. A weld seam 22 is provided at an axial end 23 of the collar 20 between the two raised portions 18. The weld seam 22 connects the fastening flange 10 to the housing part 14. The collar 20 extends in the axial direction 15. The collar 20 borders the housing part 14, so that the collar 20 runs around the housing part 14 in a closed manner. In this case, the collar 20 extends axially along the housing part 14. A rim 46 extends transversely to the collar 20, starting from the collar 20. In this case, the rim 46 preferably extends perpendicularly away from the collar 20. The rim 46 extends outward in the radial direction 13. Recesses 47 are arranged in the rim 46. In FIG. 1, two recesses 47 are arranged in the rim 46, wherein the two recesses 47 are arranged between two projections 48. Projections 48 are arranged starting from the edge 45 of the rim 46, wherein the projections 48 extend away from the edge 45 in the radial direction 13. FIG. 1 shows three projections 48 which are in each case offset through approximately 120 degrees in relation to one another in the circumferential direction 16. In this case, the recesses 47 are slot-like elongate holes. However, it is also feasible to provide the elongate hole-like recesses 47 with other shapes, such as drop-like, wave-like and zigzag shapes for example. The longitudinal side of the slot-like recesses 47 extends in the circumferential direction 16. In this case, the recesses 47 are arranged next to one another. A sheet-metal web 41 is arranged between the recesses 47 with respect to the circumferential direction 16. The sheet-metal web 41 extends from an edge 45 of the rim 46 as far as the collar 20 in the radial direction 13. The edge 45 of the rim 46 is the radially outer edge of the rim 46. The edge 45 is situated on that side of the rim 46 which is situated opposite the collar 20. A sheet-metal strip 43 is arranged between the edge 45 and the recess 47, wherein the sheet-metal strip 43 is part of the rim 46. In FIG. 1, the sheet-metal strip 43 is in the same plane as a residual rim 55 of the rim 46, wherein the residual rim 55 is arranged between the recess 47 and the collar 20. Therefore, the collar 20 is attached to the residual rim 55 and faces the housing part 14. The projections 48 in FIG. 1 are angled, so that the projections 48 are bent once in the axial direction 15 by way of a second bend 49 starting from the rim 46, so that the projections 48 have a second plane 51 which extends transversely to the plane of the rim 46. Therefore, a second bend 49 is arranged between the second plane 51 and the rim 46. The projection 48 has a first bend 53 which is at a further distance from the rim 46. Downstream of the first bend 53, a distal end 21 of the projection 48 extends in a first plane which is parallel to the rim 46. A receptacle 44 for a fastening means, such as a screw, a rivet and/or a clip for example, is formed in the distal end 21 of the projection 48 which extends in the first plane, wherein the first plane is parallel to the rim 46. In FIG. 1, the sheet-metal strip 43 is formed further inward in relation to the second bend 49 in the radial direction 13. The raised portions 18 are directed inward in the radial direction 13, so that the raised portions 18 bear against the housing part 14. The recesses 47 are arranged in the region of the raised portions 18. Therefore, some of the recesses and the raised portions are aligned with respect to the radial direction 13.

Figure 2:
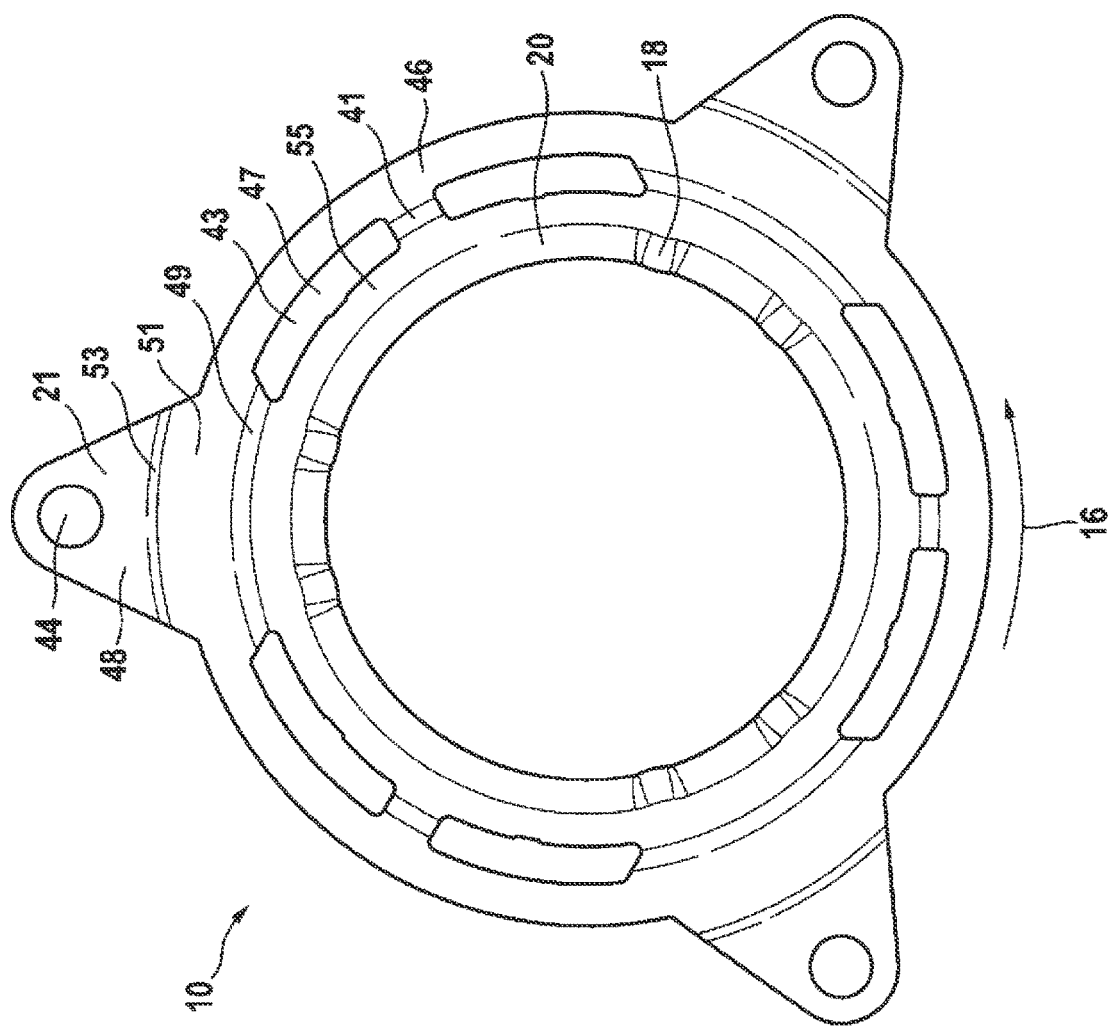
FIG. 2 shows a plan view of a fastening flange according to the invention having recesses which are arranged in the rim.

FIG. 2 depicts a fastening flange 10. The fastening flange 10 has six recesses 47 in the rim 46. In this case, in each case two recesses 47 are arranged between two projections 48. The recesses 47 have a slot-like shape. In this case, a sheet-metal web 41 is arranged between the recesses 47, as illustrated in FIG. 1. In FIG. 1, the second bend 49 is arranged directly in the rim 46 and runs around the entire fastening flange 10 in the circumferential direction 16. In this case, the second bend 49 is interrupted by the recesses 47. The second bend 49 ensures that the sheet-metal strip 43 is arranged in a plane which is tilted in relation to the plane of the residual rim 55. The raised portions 18 are arranged downstream of a projection 48 in the radial direction 13. In each case two raised portions 18 are arranged downstream of a projection 48. Therefore, the recesses 47 are arranged between two pairs of raised portions 18. By virtue of the first bend 49 which is arranged in the rim 46, the sheet-metal strip 43 merges directly and without a join with the second plane 51 of the projection 48 in the region of a projection 48, so that the sheet-metal strip 43 and the second plane 51 form a common surface. The distal end 21 of the projection 48 which extends from the first plane 51 lies in a plane which is parallel to the plane of the residual rim 55.

What is claimed is:

1. An electrical machine (12) comprising:
    a housing part (14); and
    a fastening flange (10) including
        a rim (46) having at least one recess (47) formed therein to reduce the rigidity of the fastening flange (10), and
        a plurality of portions (18), wherein each of the plurality of portions (18) is integrally formed from the fastening flange (10), is circumferentially spaced from adjacent ones of the plurality of portions (18), and projects radially inward relative to the rim (46),
    wherein the fastening flange (10) is arranged on the housing part (14) such that the rim (46) circumferentially surrounds the housing part (14) at least in sections, and
    wherein the plurality of portions (18) bear against the housing part (14) such that a plurality of radial gaps (19) are formed, wherein the plurality of radial gaps (19) are defined radially between the rim (46) and the housing part (14) and circumferentially between adjacent ones of the plurality of portions (18).

2. The electrical machine (12) according to claim 1, characterized in that the recess (47) is at a distance from a radially outer edge (45) of the rim (46), so that the rim (46) comprises a sheet-metal strip (43) which runs radially on an outside in the circumferential direction (16).

3. The electrical machine (12) according to claim 1, characterized in that a projection (48) is arranged on the rim (46), wherein the projection (48) extends radially outward starting from an edge (45) of the rim (46), wherein the recess (47) is arranged next to the projection (48) in the circumferential direction (16).

4. The electrical machine (12) according to claim 3, characterized in that a sheet-metal strip (43) of the rim (46) and a distal end (21) of the projection (48), which distal end is directed away from the rim (46), lie in two different planes.

5. The electrical machine (12) according to claim 3, characterized in that a sheet-metal strip (43) of the rim (46) and a distal end (21) of the projection (48), which distal end is directed away from the rim (46), lie in two different planes, wherein the projection (48) is angled.

6. The electrical machine (12) according to claim 1, characterized in that the fastening flange (10) has a plurality of projections (48), wherein the at least one recess (47) and at least one additional recess (47) are arranged between the projections (48) with respect to the circumferential direction (16).

7. The electrical machine (12) according to claim 1, characterized in that the at least one recess (47) and at least one additional recess (47) are formed in the rim (46), wherein the recesses (47) are situated next to one another in the circumferential direction (16) and are separated from one another by a radially extending sheet-metal web (41).

8. The electrical machine (12) according to claim 1, characterized in that the fastening flange (10) has a circular collar (20) which extends along the housing part (14) at least in sections in an axial direction (15), wherein the plurality of portions (18) are arranged in the collar (20), wherein the collar (20) surrounds the housing part (14) in the circumferential direction (16), and the rim (46) with the recess (47) extends transversely to the collar (20).

9. The electrical machine (12) according to claim 1, characterized in that the at least one recess (47) is arranged between adjacent ones of the plurality of portions (18), so that the recess (47) and the plurality of portions (18) do not overlap with one another in a radial direction (13) and the circumferential direction (16).

10. The electrical machine (12) according to claim 1, characterized in that the fastening flange (10) is produced from a sheet-metal part.

11. The electrical machine (12) according to claim 1, characterized in that the fastening flange (10) has a coating which contains tin, zinc, nickel, chromium or copper.

12. The electrical machine (12) according to claim 1, wherein the housing part (14) is in the form of a pole pot which is composed of metal.

13. The electrical machine (12) according to claim 1, wherein the housing part (14) is cylindrical.

14. The electrical machine (12) according to claim 1, characterized in that the fastening flange (10) has three projections (48), wherein the at least one recess (47) and at least one additional recess (47) are arranged between the projections (48) with respect to the circumferential direction (16).

15. The electrical machine (12) according to claim 1, characterized in that the fastening flange (10) is produced from a cold-formed sheet-metal part.

16. The electrical machine (12) according to claim 1, wherein the housing part (14) is in the form of a deep-drawn pole pot which is composed of metal.

17. The electrical machine (12) according to claim 1, wherein the fastening flange (10) includes a collar (20) that axially and transversely extends from the rim (46), and wherein each of the plurality of raised portions (18) projects radially inward from the collar (20) such that the plurality of radial gaps (19) are formed between the collar (20) and rim (46) and the housing part (14).

18. The electrical machine (12) according to claim 17, wherein the collar (20) extends from the rim (46) at a radially inner edge of the rim, wherein the fastening flange (10) further includes a plurality of projections (48) that extend from the rim (46) at a radially outer edge (45) of the rim, wherein each of the plurality of projections (48) includes a receptacle (44) for connecting elements, and wherein the receptacles (44) are arranged in distal ends (21) of respective projections (48).

19. The electrical machine (12) according to claim 1, wherein the at least one recess (47) is a first hole (47), and wherein the fastening flange (10) further includes a plurality of projections (48) that extend radially outward from the rim (46) each having a second hole (44) for a connecting element.

20. The electrical machine (12) according to claim 19, wherein the first hole (47) is an elongate hole (47) that is elongated in a circumferential direction.

21. The electrical machine (12) according to claim 1, wherein the at least one recess (47) is an elongate hole (47) that is elongated in a circumferential direction.

22. An electrical machine (12) comprising:
a housing part (14); and
a fastening flange (10) including
a rim (46) having at least one first hole (47) formed therein to reduce the rigidity of the fastening flange (10),
a plurality of portions (18), wherein each of the plurality of portions (18) is integrally formed from the fastening flange (10), is circumferentially spaced from adjacent ones of the plurality of portions (18), and projects radially inward relative to the rim (46), and
a plurality of projections (48) that extend radially outward from the rim (46), each of the projections (48) having therein a second hole (44) for a connecting element,
wherein the fastening flange (10) is arranged on the housing part (14) such that the rim (46) circumferentially surrounds the housing part (14) at least in sections, and
wherein the plurality of portions (18) bear against the housing part (14).

23. The electrical machine (12) according to claim 22, wherein the fastening flange (10) includes a collar (20) that extends from the rim (46) at a radially inner edge of the rim (46), wherein the plurality of projections (48) extend from the rim (46) at a radially outer edge (45) of the rim (46), and wherein the second holes (44) are arranged in distal ends (21) of respective projections (48).

24. The electrical machine (12) according to claim 22, wherein the first hole (47) is an elongate hole (47) that is elongated in a circumferential direction.

25. An electrical machine (12) comprising:
a housing part (14); and
a fastening flange (10) including
a rim (46) having at least one elongate hole (47) formed therein to reduce the rigidity of the fastening flange (10), wherein the at least one elongate hole (47) is elongated in a circumferential direction, and
a plurality of portions (18), wherein each of the plurality of portions (18) is integrally formed from the fastening flange (10), is circumferentially spaced from adjacent ones of the plurality of portions, and projects radially inward relative to the rim (46),
wherein the fastening flange (10) is arranged on the housing part (14) such that the rim (46) circumferentially surrounds the housing part (14) at least in sections, and
wherein the plurality of portions (18) bear against the housing part (14).

\* \* \* \* \*